US010560844B2

(12) United States Patent
Amisano et al.

(10) Patent No.: US 10,560,844 B2
(45) Date of Patent: Feb. 11, 2020

(54) AUTHENTICATION OF USERS FOR SECURING REMOTE CONTROLLED DEVICES

(71) Applicant: International Business Machines Corporation, Armonk, NY (US)

(72) Inventors: Michael A. Amisano, East Northport, NY (US); John F. Behnken, Hurley, NY (US); Jeb R. Linton, Manassas, VA (US); John Melchionne, Kingston, NY (US); David K. Wright, Riverview, MI (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/460,063

(22) Filed: Mar. 15, 2017

(65) Prior Publication Data

US 2018/0270657 A1 Sep. 20, 2018

(51) Int. Cl.
*H04W 12/06* (2009.01)
*G08C 17/02* (2006.01)
(Continued)

(52) U.S. Cl.
CPC .......... *H04W 12/06* (2013.01); *B64C 39/024* (2013.01); *G08C 17/02* (2013.01); *H04L 63/083* (2013.01);
(Continued)

(58) Field of Classification Search
CPC ..... H04W 12/06; H04W 12/08; H04W 60/04; H04W 88/02; H04W 4/046; H04W 12/04;
(Continued)

(56) References Cited

U.S. PATENT DOCUMENTS 6,799,272 B1 * 9/2004 Urata ..................... H04L 9/0866
713/169
6,864,829 B2 3/2005 Bervoets et al.
(Continued)

FOREIGN PATENT DOCUMENTS

EP 2677473 A1 12/2013
WO 2016154947 A1 10/2016

OTHER PUBLICATIONS

Amisano et al., U.S. Appl. No. 16/544,680, filed Aug. 19, 2019.
List of IBM Patents or Patent Applications Treated As Related.

*Primary Examiner* — Hunter B Lonsberry
*Assistant Examiner* — Luis A Martinez Borrero
(74) *Attorney, Agent, or Firm* — Zilka-Kotab, P.C.

(57) ABSTRACT

In one embodiment, a system includes a processing circuit and logic integrated with the processing circuit, executable by the processing circuit, or integrated with and executable by the processing circuit. The logic is configured to cause the processing circuit to limit functionality of a remote controlled device during periods of time that a user of the remote controlled device is not authenticated, and to receive identity information of the user of the remote controlled device via an authentication process, with the identity information establishing an identity of the user. Also, the logic is configured to cause the processing circuit to authenticate the user prior to allowing full functionality of the remote controlled device, send an indication of the identity of the user to the remote controlled device, and provide full functionality of the remote controlled device to the user in response to successfully authenticating the user.

19 Claims, 6 Drawing Sheets

(51) Int. Cl.
*B64C 39/02* (2006.01)
*G05D 1/00* (2006.01)
*H04L 29/06* (2006.01)

(52) U.S. Cl.
CPC .. *B64C 2201/024* (2013.01); *B64C 2201/108* (2013.01); *B64C 2201/146* (2013.01); *G08C 2201/61* (2013.01)

(58) Field of Classification Search
CPC .. G05D 1/0022; G05D 1/0011; G05D 1/0016; G05D 1/00; G05D 1/10; G05D 1/0055; B64C 39/024; B64C 2201/146; G08C 17/02
See application file for complete search history.

(56) References Cited

U.S. PATENT DOCUMENTS

| | | | | |
|---|---|---|---|---|
| 7,885,639 | B1* | 2/2011 | Satish | H04L 9/32 455/410 |
| 8,314,728 | B2 | 11/2012 | Besshi et al. | |
| 8,330,583 | B2 | 12/2012 | Beard et al. | |
| 8,655,345 | B2* | 2/2014 | Gold | H04M 1/7253 455/420 |
| 8,855,622 | B2* | 10/2014 | Gold | H04M 1/7253 455/420 |
| 8,988,192 | B2* | 3/2015 | King | G06F 21/32 340/5.82 |
| 9,060,011 | B2* | 6/2015 | Gold | H04M 1/7253 |
| 9,173,066 | B1* | 10/2015 | Jain | H04W 4/027 |
| 9,300,643 | B1* | 3/2016 | Doane | H04L 63/08 |
| 9,412,278 | B1* | 8/2016 | Gong | G06F 16/29 |
| 9,674,751 | B2* | 6/2017 | Maguire | H04W 36/18 |
| 9,787,756 | B2* | 10/2017 | Gold | H04M 1/7253 |
| 9,805,372 | B2* | 10/2017 | Gong | G06F 16/29 |
| 9,870,566 | B2* | 1/2018 | Gong | G06F 16/29 |
| 9,942,304 | B2* | 4/2018 | Gold | H04L 67/025 |
| 2002/0077114 | A1* | 6/2002 | Isham | H04L 67/36 455/454 |
| 2003/0088633 | A1* | 5/2003 | Chiu | H04L 29/06 709/206 |
| 2004/0203354 | A1 | 10/2004 | Yue | |
| 2007/0052548 | A1 | 3/2007 | Hankin et al. | |
| 2008/0285628 | A1 | 11/2008 | Gizis et al. | |
| 2008/0318564 | A1* | 12/2008 | Kreiner | G08C 17/02 455/420 |
| 2011/0016405 | A1* | 1/2011 | Grob | H04N 1/00127 715/740 |
| 2011/0105097 | A1* | 5/2011 | Tadayon | H04W 4/50 455/418 |
| 2011/0221622 | A1* | 9/2011 | West | G08C 17/02 341/176 |
| 2012/0146918 | A1* | 6/2012 | Kreiner | H04M 1/7253 345/173 |
| 2012/0206236 | A1 | 8/2012 | King | |
| 2013/0262873 | A1* | 10/2013 | Read | H04W 12/06 713/186 |
| 2014/0143839 | A1* | 5/2014 | Ricci | H04W 12/06 726/4 |
| 2014/0335823 | A1* | 11/2014 | Heredia | H04L 51/38 455/411 |
| 2015/0244699 | A1* | 8/2015 | Hessler | G06F 21/44 726/7 |
| 2015/0336270 | A1 | 11/2015 | Storr | |
| 2016/0063853 | A1* | 3/2016 | Mi | G08C 17/02 340/12.5 |
| 2016/0274578 | A1 | 9/2016 | Arwine | |
| 2016/0308859 | A1* | 10/2016 | Barry | H04L 63/0861 |
| 2017/0083979 | A1* | 3/2017 | Winn | H04L 67/12 |
| 2018/0013815 | A1* | 1/2018 | Gold | H04L 67/025 |
| 2018/0068567 | A1* | 3/2018 | Gong | H04W 4/022 |
| 2018/0253092 | A1* | 9/2018 | Trapero Esteban | G05D 1/0022 |
| 2019/0047695 | A1* | 2/2019 | Boudville | B64C 39/024 |
| 2019/0373468 | A1 | 12/2019 | Amisano et al. | |

* cited by examiner

AUTHENTICATION OF USERS FOR SECURING REMOTE CONTROLLED DEVICES

BACKGROUND

The present invention relates to authentication of a user of a remote controlled device, and more particularly, to securing a remote controlled device via an authentication process.

Currently, users of remote controlled devices are not able to be identified based on the remote controlled device itself. Therefore, as more and more remote controlled devices, such as aviation drones, are being used, there is no method available for identification of a pilot operating a specific drone. This is especially problematic when the drone is being operated in a dangerous, malicious, and/or illegal manner by the pilot, who may remain anonymous while possibly subjecting others to harm.

SUMMARY

In one embodiment, a system includes a processing circuit and logic integrated with the processing circuit, executable by the processing circuit, or integrated with and executable by the processing circuit. The logic is configured to cause the processing circuit to limit functionality of a remote controlled device during periods of time that a user of the remote controlled device is not authenticated. The logic is also configured to cause the processing circuit to receive identity information of the user of the remote controlled device via an authentication process, with the identity information establishing an identity of the user. Also, the logic is configured to cause the processing circuit to authenticate the user prior to allowing full functionality of the remote controlled device. Moreover, the logic is configured to cause the processing circuit to send an indication of the identity of the user to the remote controlled device and provide full functionality of the remote controlled device to the user in response to successfully authenticating the user.

In another embodiment, a system includes a processing circuit and logic integrated with the processing circuit, executable by the processing circuit, or integrated with and executable by the processing circuit. The logic is configured to cause the processing circuit to pair a remote controller to a remote controlled device. The logic is also configured to cause the processing circuit to receive an indication of an identity of a user of the remote controlled device from the remote controller. Moreover, the logic is configured to cause the processing circuit to store the indication of the identity of the user to a memory of the remote controlled device.

In yet another embodiment, a computer program product includes a computer readable storage medium having program instructions embodied therewith. The embodied program instructions are executable by a processing circuit to cause the processing circuit to wirelessly couple, by the processing circuit, a mobile electronic device to a remote controller of a remote controlled device. The embodied program instructions are also executable to cause the processing circuit to maintain, by the processing circuit, a pairing between the mobile electronic device and the remote controller during operation of the remote controlled device. Moreover, the embodied program instructions are executable to cause the processing circuit to send, by the processing circuit, an indication of an identity of a user of the remote controlled device to the remote controller, the remote controlled device, or the remote controller and the remote controlled device.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products for authenticating a user of a remote controlled device prior to allowing full functionality of the remote controlled device.

In one general embodiment, a system includes a processing circuit and logic integrated with the processing circuit, executable by the processing circuit, or integrated with and executable by the processing circuit. The logic is configured to cause the processing circuit to limit functionality of a remote controlled device during periods of time that a user of the remote controlled device is not authenticated. The logic is also configured to cause the processing circuit to receive identity information of the user of the remote controlled device via an authentication process, with the identity information establishing an identity of the user. Also, the logic is configured to cause the processing circuit to authenticate the user prior to allowing full functionality of the remote controlled device. Moreover, the logic is configured to cause the processing circuit to send an indication of the identity of the user to the remote controlled device and provide full functionality of the remote controlled device to the user in response to successfully authenticating the user.

In another general embodiment, a system includes a processing circuit and logic integrated with the processing circuit, executable by the processing circuit, or integrated with and executable by the processing circuit. The logic is configured to cause the processing circuit to pair a remote controller to a remote controlled device. The logic is also configured to cause the processing circuit to receive an indication of an identity of a user of the remote controlled device from the remote controller. Moreover, the logic is configured to cause the processing circuit to store the indication of the identity of the user to a memory of the remote controlled device.

In yet another general embodiment, a computer program product includes a computer readable storage medium having program instructions embodied therewith. The embodied program instructions are executable by a processing circuit to cause the processing circuit to wirelessly couple, by the processing circuit, a mobile electronic device to a remote controller of a remote controlled device. The embodied program instructions are also executable to cause the processing circuit to maintain, by the processing circuit, a pairing between the mobile electronic device and the remote controller during operation of the remote controlled device. Moreover, the embodied program instructions are executable to cause the processing circuit to send, by the processing circuit, an indication of an identity of a user of the remote controlled device to the remote controller, the remote controlled device, or the remote controller and the remote controlled device.

Figure 1:
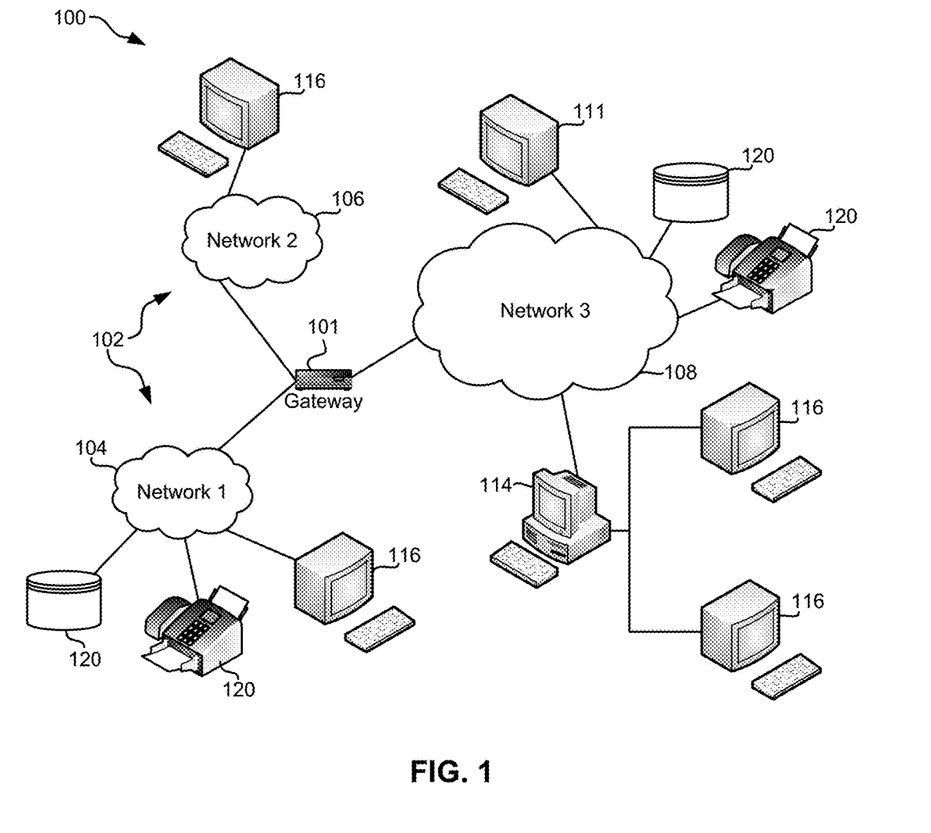
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
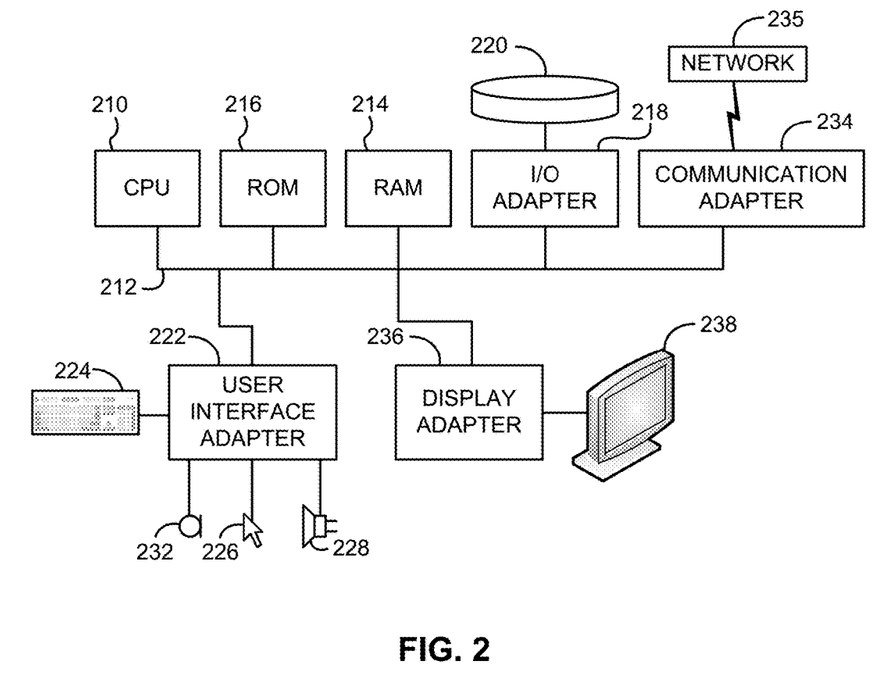
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

According to one embodiment, a remote controlled device may be unlocked in response to an authentication process that authorizes the user of the remote controlled device to fully use the available functionality of the remote controlled device. The authentication process, in a further embodiment, may rely on validation of a predetermined number, profile, or some other identification information that the user is required to provide to a validation service via a remote controller. Moreover, in yet another embodiment, the user may be required to provide the identification information in an ongoing basis while operating the remote controlled device.

Figure 3:
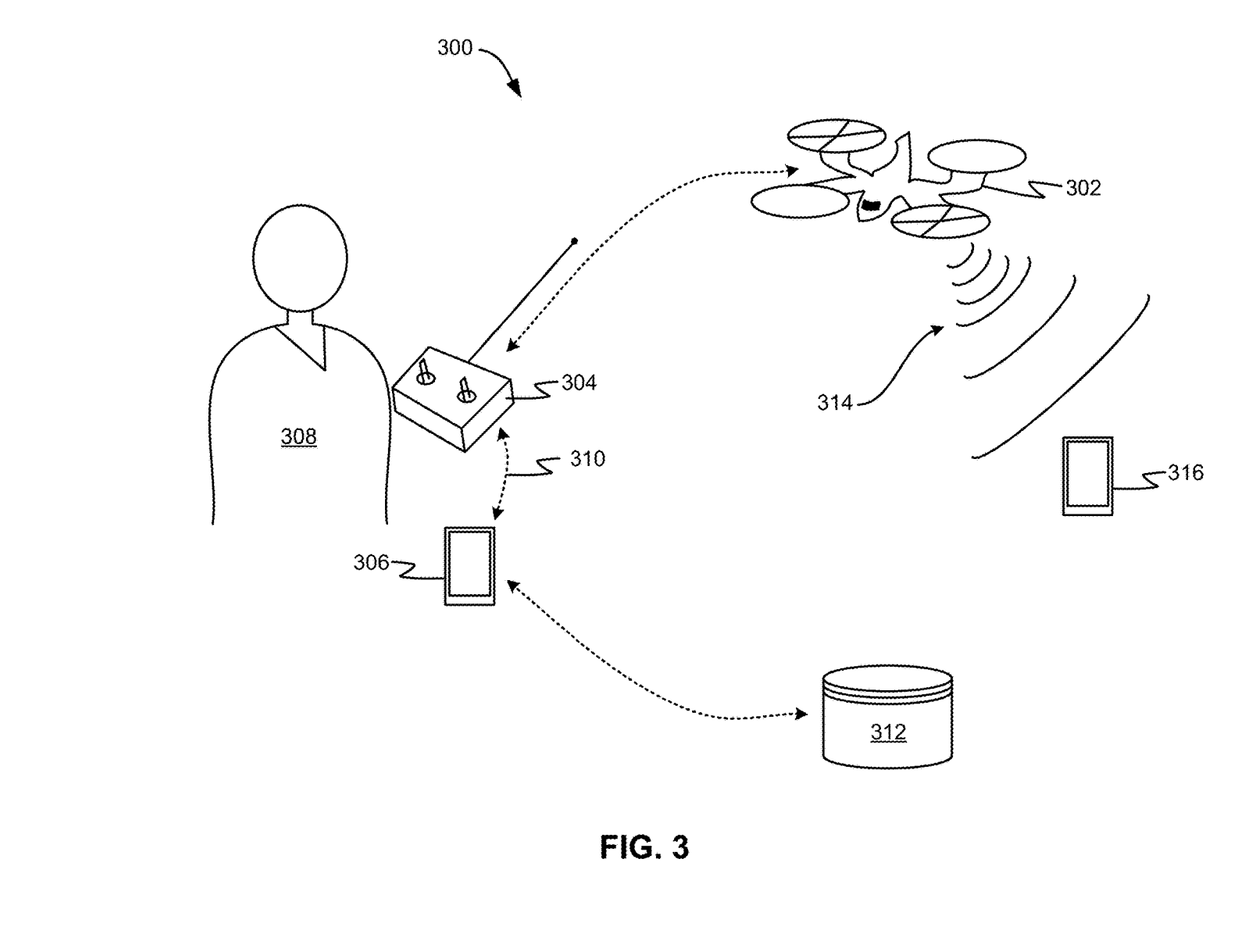
FIG. 3 illustrates a system for securing a remote controlled device, in accordance with one embodiment.

Now referring to FIG. 3, a system 300 is shown that provides for securing a remote controlled device 302 in one embodiment. The system 300 includes the remote controlled device 302 and a remote controller 304 capable of communicating with the remote controlled device 302 (e.g., sending operational commands to the remote controlled device 302 for directing actions of the remote controlled device 302). In some further embodiments, an authentication device 306 may be included that is configured to authenticate a user 308 of the remote controller 304 and remote controlled device 302, as described herein in more detail.

In one embodiment, the authentication device 306 may be a separate independent device in communication with the remote controlled device 302, the remote controller 304, or both. In an alternate embodiment, the authentication device 306 may be a part of and/or integrated with the remote controlled device 302, the remote controller 304, or both.

Any device may be used as the authentication device 306 that is suitable for authenticating a user of the remote controlled device 302, such as a mobile telephone, smart phone, digital assistant device, smart watch, laptop computer, notebook computer, or some other dedicated electronic device having a communication channel configured to wirelessly communicate with the remote controlled device 302, the remote controller 304, or both.

According to current requirements for operation of a remote controlled device 302, the identity of the user 308 is not visible or obtainable from the remote controlled device 302 itself. Therefore, there is no way to identify the user 308 when a remote controlled device 302 is being operated in an unsafe, dangerous, and/or illegal manner.

Therefore, in one embodiment, the authentication device 306, which may be a mobile electronic device such as a mobile telephone, may be paired with and provide identity information of the user 308 to the remote controller 304 after performing an authentication process to ensure that the user 308 is actually the person they identify as. Moreover, the authentication device 306 or some other component of the system 300 may communicate with a database 312 that includes records of authorized users for the remote controlled device 302 with which to verify the identity of the user 308 as an authorized user, such as by comparing the identity information with records in the database 312. The database 312 may be located remotely from the system 300 and may be administered by a governmental agency or some other group tasked with ensuring the safe operation of remote controlled devices of a type being used by the user 308.

The remote controller 304 that controls the remote controlled device 302 then uploads and/or sends identification information of the user 308 (a validated registration number, identifier (ID), etc.), to the receiver of the remote controlled device 302 and/or the remote controller 304, thereby allowing the remote controller 304 to unlock full functionality of the remote controlled device 302 (flight mode for aviation devices, submersion mode for submersible devices, high speed travel for land-based devices, etc.). This may be accomplished by removing a rotations per minute (RPM) limiter that is by default set on the remote controlled device 302 for at least one component thereof (e.g., prop(s) for a plane, propeller(s) for a hovering aviation device or watercraft, wheels or treads for a land-based device, etc.).

In more approaches, the remote controlled device 302 may be allowed to power on and perform simple functions in order to allow for diagnostics or other service-type activities to be performed on the remote controlled device 302 without allowing the remote controlled device 302 to perform full functionality.

In another embodiment, a trainer/trainee setting may be enabled on the remote controller 304 and/or the remote controlled device 302 that allows the trainer to hand off the remote controller 304 to the trainee without functionality of the remote controlled device 302 being limited due to this transition of control. However, this setting must be accessed intentionally, and is may be disabled on the remote controlled device 302 by default, and only accessible when authorization of the user 308 indicates that this functionality should be provided to the user 308, e.g., the user 308 is verified as a trainee for the remote controlled device 302.

Moreover, an ongoing communication link 310 is established between the authentication device 306 and the remote controller 304 that must be maintained during operation of the remote controlled device 302. Then, the identification information of the user 308 may be broadcast 314 from the remote controlled device 302 to allow pilot identification by any third party device 316 that is able to receive and interpret the broadcast 314.

There is no requirement in this scheme of on-going communications with a third party vendor or agency for continuous or on-going validation of the user 308. Instead, some other technique is used to ensure the same user who is authorized to use the remote controlled device 302 is actually operating the device.

Moreover, in the initial binding process between the remote controller 304 and the remote controlled device 302, the remote controller 304 may be configured to search for a closest transceiver, and then binds with the remote controlled device 302 which precludes any other remote controller from controlling the remote controlled device 302 unless a subsequent binding process is performed between the different remote controller and the remote controlled device 302. During this initial binding process, the remote controller 304 may send an indication of the identity of the user 308, thereby ensuring that this information is stored to the remote controlled device 302 prior to operation thereof by the user 308.

In one embodiment, a mobile device, such as a tablet, smartwatch, laptop, mobile telephone, etc., is used to authenticate the user 308 to the remote controller 304, and then the remote controller 304 to the remote controlled device 302, allowing the user 308 to not have access to the internet (out of mobile network range, no cell service, etc.) after the initial binding process (authorization and pairing) of the mobile device to the remote controller 304. Once the user 308 is validated and authenticated via the user's mobile telephone or other mobile electronic device registered to the user 308, validation is stored allowing the user 308 to validate who they are with the remote controller 304 prior to operation of the remote controlled device 302.

In one embodiment, only one user 308 is allowed to be authenticated on any single remote controlled device 302, thereby eliminating any ambiguity of the operator of the device, e.g., this feature is a security measure that ensures only one pilot in command (PIC) of an aircraft at a time to ensure robust security, that FAA expectations are met, and responsibility of a single individual is ensured. For other types of remote controlled devices other than aircraft, similar security may be provided even though there may not be explicit requirements from an authorizing agency of the government.

Figure 4:
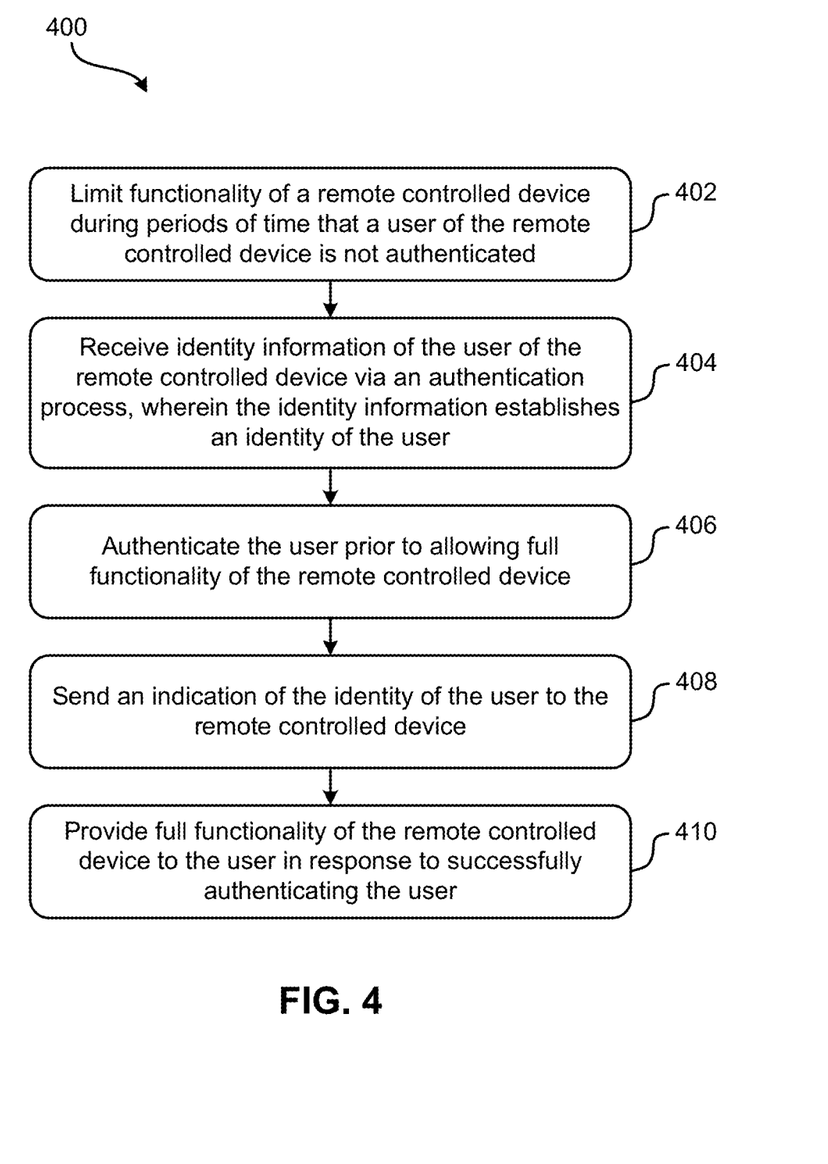
FIG. 4 shows a flowchart of a method, according to one embodiment.

Now referring to FIG. 4, a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a cloud server, a portable computer, a mobile telephone, a handheld or wearable computer, a remote controller, a remote controlled device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 400. Illustrative processors include, but are not limited to, a CPU, an ASIC, a FPGA, etc., combinations thereof, or any other suitable computing device known in the art.

As shown in FIG. 4, method 400 may start with operation 402, where functionality of a remote controlled device is restricted during periods of time that a user of the remote controlled device is not authenticated. By restricted, what is meant is that full functionality of the remote controlled device is not available and/or not allowed.

One period of time that the user of the remote controlled device is not authenticated is prior to an authentication process being performed. Therefore, in order to fully utilize and control the remote controlled device, the user must be authenticated via the authentication process, in one approach. Another period of time that the user of the remote controlled device is not authenticated is when the user changes during operation of the remote controlled device, in which case the authentication process is repeated for the new user to determine whether the new user is authorized to operate the remote controlled device.

In accordance with one embodiment, restricted functionality of the remote controlled device may include zero functionality being available, e.g., the remote controlled device may not respond to any commands sent by the remote controller until the user providing the commands is authenticated as someone with authorization to operate the remote controlled device.

In one embodiment, the remote controlled device may be disallowed from achieving full speed of movement while the functionality of the remote controlled device is restricted. For example, when the remote controlled device is a drone aircraft, the aircraft may be restricted from lifting off the ground due to insufficient rotor speed. In another example, when the remote controlled device is a radio controlled watercraft, the watercraft may be restricted from moving through the water at more than 10% of a maximum speed due to insufficient propeller speed.

In other embodiments, the remote controlled device may be disallowed from accessing some functionality available to the remote controlled device during normal operation. For example, one or more cameras of the remote controlled device may be disabled while the functionality of the remote controlled device is restricted. In another example, audio recording and/or transmission may be disabled while the functionality of the remote controlled device is restricted. In yet another embodiment, programmed movement of the remote controlled device that does not require commands to be received from the remote controller may be disabled while the functionality of the remote controlled device is restricted. Of course, many other types of functionality restriction may be performed in accordance with the embodiments provided herein, as would be apparent to one of skill in the art upon reading the present descriptions.

In operation 404, identity information of the user of the remote controlled device is received via an authentication process. The identity information establishes an identity of the user, and full control of the remote controlled device is restricted until the identity information is provided and the user is authenticated.

In one embodiment, the identity information may be a unique identifying metric assigned to the user for the particular remote controlled device, or type of remote controlled device (drone aircraft, radio controlled car, drone watercraft, etc.), that the user is attempting to control via the remote controller.

The identity information may be obtained by the remote controller, by an authentication device separate from and independent from the remote controller, by the remote controlled device, or via some other suitable device as would be known in the art.

In various embodiments, the identity information may include one or more of the following pieces of information: a fingerprint and/or thumbprint of the user, a voice sample of the user, an optical scan of an eye of the user, facial recognition of the user's face, a secure link with an electronic device of the user, a unique alphanumeric code provided to the user by an authorizing agency of the remote controlled device, etc. Of course, many other types of identity information may be used to identify the user with a sufficient degree of certainty that would be difficult or impossible to fake or manufacture by an imposter, as would be apparent to one of skill in the art upon reading the present descriptions.

In one embodiment, the authentication device may be a mobile device, e.g., tablet, smartwatch, laptop, mobile telephone or smartphone, etc., of the user that is executing an application that is configured to cause the mobile device to pair with the remote controller and maintain the pairing for a duration of the operation of the remote controlled device.

In this embodiment, the method 400 may further include maintaining a wireless link (such as via Bluetooth, multiple input-multiple output (MIMO), radio frequency (RF) transmissions, a mobile network connection, near field communication (NFC), etc., between the mobile device and the remote controller during operation of the remote controlled device. Moreover, method 400 may further include restricting functionality of the remote controlled device in response to detection of a disruption in the wireless link between the mobile device and the remote controller for greater than a predetermined amount of time during operation of the remote controlled device. This predetermined amount of time may be 1 second, 10 seconds, 30 seconds, 1 minute, or some other period of time which does not unduly inhibit operation of the remote controlled device but also ensures that the user is still operating the remote controlled device and has not given away the remote controller or had the remote controller taken by a third party that has not been authenticated.

In this case, method 400 may further include terminating provision of commands (stop sending operational commands) to the remote controlled device from the remote controller to control functionality of the remote controlled device in response to the detection of the disruption in the link between the mobile device and the remote controller for greater than the predetermined amount of time.

In operation 406, the user is authenticated prior to allowing full functionality of the remote controlled device. In one embodiment, an authentication process is utilized to authenticate the user, and this process may access the internet to obtain verification that the identity information of the user corresponds with a user who is authorized to operate the type of remote controlled device and/or the particular remote controlled device that the user is attempting to control via the remote controller.

For example, the Federal Aviation Administration (FAA) requires that an unmanned aircraft of greater than 0.55 lb. be registered with the FAA for operation of such an aircraft in allowable areas. Therefore, when the remote controlled device is a drone aircraft of greater than 0.55 lb., the user may be required to provide a registration number for the aircraft that may be verified by searching the Small Unmanned Aircraft System (sUAS) Registration Service for a matching registration number. In some circumstances, the user may be required to be registered with the FAA as well, and therefore the authentication process may also request this pilot registration number from the user to perform the authentication process.

Radio Controlled Pilots flying in some other countries must register themselves with an equivalent regulatory organization (in the other country) to fly remote controlled devices. Once registered, these other regulatory organizations may provide a unique registration number. In one embodiment, the unique registration number or certificate may be stored in the remote controller and/or the remote controlled device upon authentication of the user, and broadcast therefrom to identify the user to anyone within range of the broadcast.

In another example, a database may be created and maintained that includes unique identifiers for all pilots authorized and vetted to operate certain types of remote controlled devices, such as factory robots used in manufacturing and goods production (e.g. painting robots, automated forklifts, remote controlled articulating cranes and pickers, etc.), military unmanned vehicles such as bomb-defeating robots, aerial drone aircraft having weapons, surveillance, or other specialized equipment not intended for general civilian use, search and rescue drones capable of entering hostile or dangerous locations to search for survivors or identify threats to people, etc.

In one embodiment, method 400 may include pairing a remote controller to the remote controlled device prior to authenticating the user (this step is useful to ensure that the user of the remote controller is controlling the appropriate device and not some other device on a similar frequency or setting), communicating wirelessly with the remote controlled device via the remote controller, and providing commands (operational commands) to the remote controlled device to control functionality of the remote controlled device in response to input from the user via the remote controller.

In another embodiment, method 400 may include periodically re-authenticating the user during operation of the remote controlled device via a series of re-authentication processes. These re-authentication processes may be the same as the original authentication process, or may be simplified versions of this original process to limit the disruption to operation of the remote controlled device. Moreover, as used herein, "periodically" may refer to sequential passage of a particular time period; sequential passage of differing time periods such as time periods calculated randomly, based upon a predefined pattern, etc.; or any other passage of one or more time periods, however selected, between occurrence of one or more events such as re-authentication, transmission, etc.

In one embodiment, when a fingerprint of the user is used for authentication, the user may continue to place his/her finger on a fingerprint reader of the remote controller while operating the remote controlled device. In this way, the remote controller may periodically read the fingerprint again to ensure that the authorized user is still operating the remote controller and not some other person.

In another embodiment, when a voice sample of the user is used for authentication, the user may be asked to speak a predetermined password or phrase, and re-authentication may take place based on a current user's response to this request.

In response to detection that a re-authentication process failed to complete successfully, method 400 includes restricting functionality of the remote controlled device. This restriction will be maintained until the user is successfully authenticated (again, or for the first time for a new user).

In operation 408, an indication of the identity of the user is sent to the remote controlled device. This indication may be of any form that allows the user to be identified based on the indication alone. For example, the indication may include one or more of the following pieces of information: a name of the user, a physical address of the user, an internet protocol (IP) address of the remote controller and/or the authentication device, a media access control (MAC) address of the remote controller and/or the authentication device, an image depicting at least a face of the user, a registration code unique to the user, the registration code being provided by an authorizing agency of the remote controlled device, etc. Of course, many other types of indications of the identity of the user may be used to identify the user, as would be apparent to one of skill in the art upon reading the present descriptions.

In operation 410, full functionality of the remote controlled device is provided to the user in response to successfully authenticating the user. A successful authentication process is one in which the identity of the user is verified, and it is determined that this particular user is authorized to operate the specific remote controlled device for which the user is attempting to operate.

In an alternate embodiment, restricted functionality may still be provided to the user based on a class of user. The various classes of users may dictate a level of functionality that is allowed by any user who belongs to a specific class. For example, a provisional watercraft pilot may not be allowed to exceed a certain predetermined speed of travel. In another example, for a bomb-defeating robot, weapons or explosives may be disengaged when the class of the user dictates that the bomb-defeating robot is being used in exercises or training missions. Of course, many other classes of users and restricted functionality of the remote controlled device may be provided in accordance with the embodiments provided herein, as would be apparent to one of skill in the art upon reading the present descriptions.

In one embodiment, method 400 may include causing the remote controlled device to periodically broadcast the indication of the identity of the user during operation of the remote controlled device. The broadcast may be made every second, every 10 seconds, every minute, every 2 minutes, etc., such that the identity of the user may be readily obtained by any third party that seeks to know who is operating the remote controlled device. This broadcast is not intended to be encrypted or obscured, but instead is to make apparent the user of the remote controlled device rather easily.

This is beneficial for situations where a remote controlled device is being operated in an unlawful and/or unsafe manner, and it is beneficial to know who is operating the remote controlled device in order to correct the manner of operation, whether it be through law enforcement action, additional training of the user, revocation of the authorization to operate the remote controlled device, or some other suitable recourse.

Moreover, the broadcast of the user's information is made to anyone within range of the signal sent from the remote controlled device (such as RF signals, microwave signals, infrared or other light signals, etc.) keeping it simple to identify the user, such as via an application on a mobile electronic device (smartphone, tablet, etc.) should the identity of the user be desired.

These techniques of broadcasting an identity of the user may also be useful for spectators to identify pilots of remote controlled devices during races or other events where a plurality of remote controlled devices may all be participating at the same time and confusion may be present as to which device is being piloted by which user.

Method 400 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 400.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 400.

Figure 5:
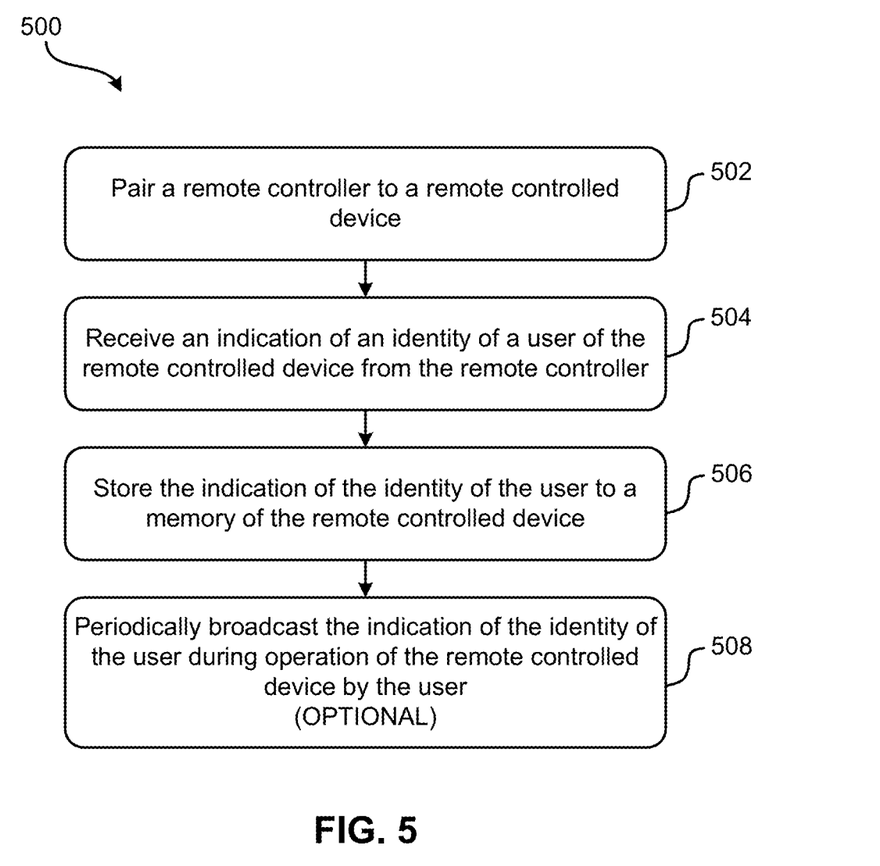
FIG. 5 shows a flowchart of another method, according to one embodiment.

Now referring to FIG. 5, a method 500 is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a cloud server, a portable computer, a mobile telephone, a handheld or wearable computer, a remote controller, a remote controlled device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a CPU, an ASIC, a FPGA, etc., combinations thereof, or any other suitable computing device known in the art.

As shown in FIG. 5, method 500 may start with operation 502, where a remote controller is paired to a remote controlled device. This pairing procedure may be performed using any pairing technique known in the art, such as via Bluetooth RF signal interaction, via MIMO, via NFC signal interaction, by sending and receiving wireless signals, or any other pairing technique that effectively causes the remote controlled device to only respond to commands that are sent by the remote controller to which the remote controlled device has been paired, as would be understood by one of skill in the art upon reading the present descriptions.

In operation 504, an indication of an identity of a user of the remote controlled device is received from the remote controller. This indication of the identity may take many different forms, such as those previously described with respect to FIG. 4, as well as those not specifically described herein. Moreover, the indication of the identity of the user may be received via any suitable wireless technology known in the art, such as WiFi, Bluetooth, MIMO, RF signals, NFC, or some other suitable technology that provides for data exchange between paired devices.

In various embodiments, the indication of the identity of the user may include one or more of the following types of information: a name of the user, a date of birth of the user, a social security number or other government issued identifier of the user, a physical address of the user, an IP address of the remote controller, a MAC address of the remote controller, an image depicting at least a face of the user, a registration code unique to the user, the registration code being provided by an authorizing agency of the remote controlled device, etc.

In operation 506, the indication of the identity of the user is stored to a memory of the remote controlled device. Any suitable memory or memory type may be used to store the indication of the identity, such as those described herein and others not specifically described, but known to those of skill in the art.

In optional operation 508, the indication of the identity of the user is periodically broadcast during operation of the remote controlled device by the user. The period of broadcast may be any time frame determined in the pairing between the remote controller and the remote controlled device, a time frame that is standardized for identification broadcasts by some government agency, or some other time frame suitable for determining, without a prolonged delay, an identity of the user of the remote controlled device.

In a further embodiment, method 500 may include receiving indication from the remote controller that the user is not authenticated to use the remote controlled device. This indication may be sent by the remote controller in response to a determination that an authentication process did not complete successfully. Thereafter, functionality of the remote controlled device may be restricted to the user during periods of time that the user is not authenticated in response to receiving the indication that the user is not authenticated to use the remote controlled device. This step ensures that an unauthorized user is not able to access and operate the remote controlled device, thereby preventing or reducing an amount of harm that may occur due to operation by the unauthorized user.

As previously described, restricted functionality may include any limit on functionality, such as not allowing the remote controlled device to achieve full speed of movement of at least one component thereof (propeller(s), prop(s), wheel(s), turbine(s), etc.) while the functionality of the remote controlled device is restricted.

According to another embodiment, method 500 may include receiving indication from the remote controller that a periodic re-authentication process of the user failed to complete successfully, such as due to the user not being authorized to operate the remote controlled device, a problem with communication between the remote controller and an authentication device, the user providing the remote controller to a third party, etc. In response to receiving the indication that the periodic re-authentication process failed to complete successfully, functionality of the remote controlled device is restricted to prevent the unauthorized user from using (when the functionality is completely restricted) and/or fully using the remote controlled device.

In yet another embodiment, method 500 may include receiving identity information of the user from the remote controller via an authentication process. In this case, the identity information establishes an identity of the user. In response to receiving the identity information, the user may be authenticated prior to allowing full functionality of the remote controlled device. This authentication process may include, in one approach, comparing the identity information received with a remotely accessible database that includes identity information of all users authorized to operate the remote controlled device, such as a government registry, an association or group database, a company's database that produces the remote controlled device, etc.

In response to successfully authenticating the user, full functionality of the remote controlled device (or some subset of functionality) may be provided to the user in accordance with the type of authentication that is granted to the user.

In various embodiments, the identity information may include one or more pieces of information selected from the following: a fingerprint of the user, a voice sample of the user, an optical scan of an eye of the user, facial recognition of the user, a unique alphanumeric code provided to the user by an authorizing agency of the remote controlled device, etc.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

Figure 6:
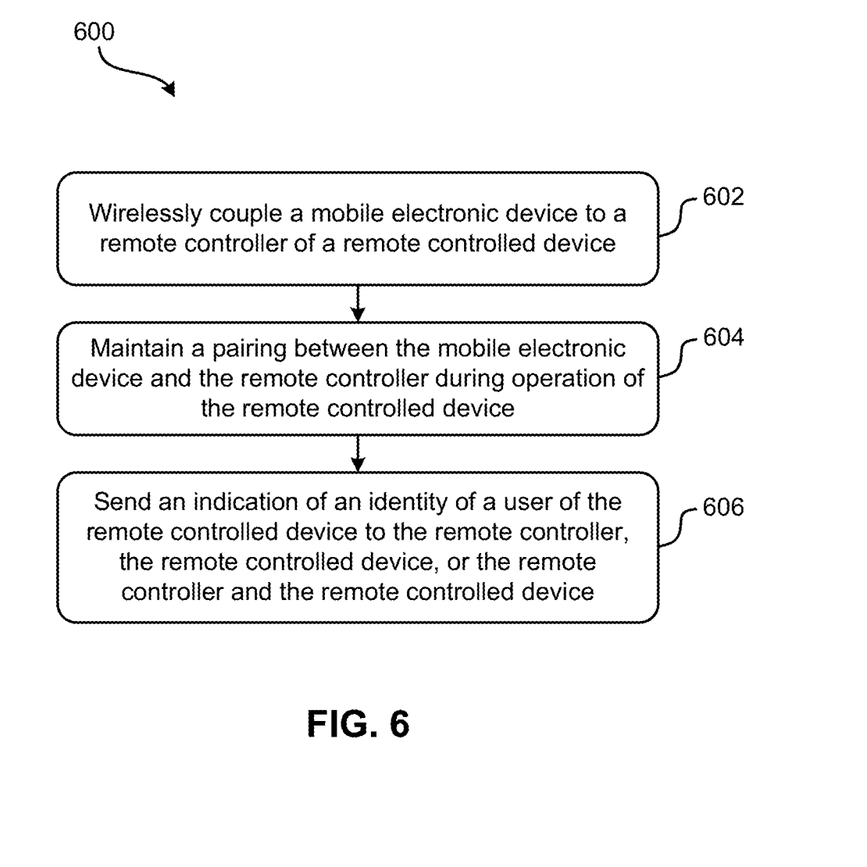
FIG. 6 shows a flowchart of a method, according to another embodiment.

Now referring to FIG. 6, a method 600 is shown according to one embodiment. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a cloud server, a portable computer, a mobile telephone, a handheld or wearable computer, a remote controller, a remote controlled device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a CPU, an ASIC, a FPGA, etc., combinations thereof, or any other suitable computing device known in the art.

As shown in FIG. 6, method 600 may start with operation 602, where a mobile electronic device is wirelessly coupled to a remote controller of a remote controlled device. This process may also be referred to as pairing the mobile electronic device with the remote controller, and may utilize any suitable communication channel available on both devices, such as Bluetooth, MIMO, Wi-Fi, RF, NFC, etc.

The mobile electronic device may be any electronic device that is configured to communicate wirelessly with the remote controller and also includes a processing circuit and memory capable of sending information to the remote controller. Illustrative mobile electronic devices include, but are not limited to, a mobile telephone, a smartphone, a personal digital assistant, a touchpad, a notebook computer, a laptop computer, a chrome book, a netbook, a smartwatch, etc.

The remote controller is configured to communicate wirelessly with a remote controlled device in order to provide operational commands to the remote controlled device for operation thereof.

In operation 604, the pairing between the mobile electronic device and the remote controller is maintained during operation of the remote controlled device. This pairing serves as an indication that the user is still utilizing the remote controller, and that some unauthorized third party has not taken control of the remote controlled device.

In operation 606, an indication of an identity of a user of the remote controlled device is sent (from the mobile electronic device in one approach) to the remote controller, the remote controlled device, or the remote controller and the remote controlled device, in various approaches. In this way, one or more of the remote controller and the remote controlled device are able to store the indication of the identity of the user.

In various embodiments, the indication of the identity of the user may include one or more of the following: a name of the user, a physical address of the user, an IP address of the remote controller and/or the mobile electronic device, a MAC address of the remote controller and/or the mobile electronic device, an image depicting at least a face of the user, a registration code unique to the user, the registration code being provided by an authorizing agency of the remote controlled device, etc.

In some additional embodiments, identity information of the user may be received via an authentication process. The authentication process may be executed on the remote controller, on the mobile electronic device, or via some combination of these two devices. The identity information establishes the identity of the user, and may utilize remotely accessible information to verify the identity of the user as an authorized operator of the remote controlled device.

Furthermore, the method 600 may include the remote controller, the mobile electronic device, or a combination of these two devices authenticating the user by comparing the identity information with a remotely accessible database that includes identity information of all users authorized to operate the remote controlled device.

In a further embodiment, method 600 may include sending an indication to the remote controller, the remote controlled device, or the remote controller and the remote controlled device to provide full functionality of the remote controlled device to the user in response to successfully authenticating the user via the authentication process.

In this embodiment, the identity information may include any of the following: a fingerprint of the user, a voice sample of the user, an optical scan of an eye of the user, facial recognition of the user, a unique alphanumeric code provided to the user by an authorizing agency of the remote controlled device, etc.

Moreover, method 600 may include storing (such as on the mobile electronic device, the remote controller, and/or the remote controlled device) the indication of the identity of the user. Moreover, method 600 may include periodically resending the indication of the identity of the user (from the mobile electronic device) to the remote controller, the remote controlled device, or the remote controller and the remote controlled device. This may act as a heartbeat function that ensures that the same user is currently operating the remote controller (and therefore the remote controlled device).

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a processing circuit; and
logic integrated with the processing circuit, executable by the processing circuit, or integrated with and executable by the processing circuit, the logic being configured to cause the processing circuit to:
limit functionality of a remote controlled device during a first period of time where a user of the remote controlled device is not authenticated, including:
setting a rotations per minute (RPM) limiter on one or more propellers of the remote controlled device,
disabling one or more cameras of the remote controlled device, and
disabling audio recording and transmission of the remote controlled device;
receive, from a separate authentication device, identity information of the user of the remote controlled device and information of the remote controlled device via an authentication process, wherein the identity information establishes an identity of the user and the remote controlled device, and includes a unique code provided to the user by an authorizing agency of the remote controlled device as well as a registration number for the remote controlled device;
authenticate the user prior to allowing full functionality of the remote controlled device, including:
communicating with a database that includes records of authorized users for the remote controlled device,
comparing the identity information of the user with the records of the database, and
verifying the identity of the user, based on the comparing;
send an indication of the identity of the user to the remote controlled device;
provide full functionality of the remote controlled device to the user during a second period of time in response to the authenticating;
maintain a wireless link to the separate authentication device during operation of the remote controlled device;
detect a disruption in the wireless link for greater than a predetermined amount of time during the operation of the remote controlled device; and
restrict the functionality of the remote controlled device, in response to detecting the disruption, including terminating a provision of operation commands to the remote controlled device.

2. The system as recited in claim 1, wherein the identity information further comprises:
a fingerprint of the user;
a voice sample of the user;
an optical scan of an eye of the user;
facial recognition of the user; and
a secure link with an electronic device of the user.

3. The system as recited in claim 1, wherein the logic is further configured to cause the processing circuit to, in response to determining during the authenticating that the user is verified as a trainee for the remote controlled device, enable a trainer/trainee setting that allows a trainer to provide control of the remote controlled device to the trainee without functionality of the remote controlled device being limited.

4. The system as recited in claim 1, wherein the logic is further configured to cause the processing circuit to, during operation of the remote controlled device:
periodically read a fingerprint of the user to ensure that the user is still controlling the remote controlled device,
request a spoken password from the user, and
perform a re-authentication of the user, based on the spoken password.

5. The system as recited in claim 1, wherein the indication of the identity of the user includes:
a name of the user,
a physical address of the user,
an internet protocol (IP) address of a remote controller and the authentication device,
a media access control (MAC) address of the remote controller and the authentication device,
an image depicting at least a face of the user,
a registration code unique to the user, and
the unique code provided to the user by the authorizing agency of the remote controlled device.

6. The system as recited in claim 1, wherein the logic is further configured to cause the processing circuit to restrict the full functionality of the remote controlled device to the user to a predetermined level of functionality, based on a class of the user.

7. The system as recited in claim 1, wherein the logic is further configured to cause the processing circuit to:
in response to determining during the authenticating that the user is verified as a trainee for the remote controlled device, enable a trainer/trainee setting that allows a trainer to provide control of the remote controlled device to the trainee without functionality of the remote controlled device being limited; and
during operation of the remote controlled device:
periodically read a fingerprint of the user to ensure that the user is still controlling the remote controlled device,
request a spoken password from the user, and
perform a re-authentication of the user, based on the spoken password;
wherein the identity information further comprises:
a fingerprint of the user,
a voice sample of the user,
an optical scan of an eye of the user,
facial recognition of the user, and
a secure link with an electronic device of the user;
wherein the indication of the identity of the user includes:
a name of the user,
a physical address of the user,
an internet protocol (IP) address of a remote controller and the authentication device,
a media access control (MAC) address of the remote controller and the authentication device,
an image depicting at least a face of the user,
a registration code unique to the user, and
the unique code provided to the user by the authorizing agency of the remote controlled device.

8. A method, comprising:
limiting functionality of a remote controlled device during a first period of time where a user of the remote controlled device is not authenticated, including:
setting a rotations per minute (RPM) limiter on one or more propellers of the remote controlled device,
disabling one or more cameras of the remote controlled device, and
disabling audio recording and transmission of the remote controlled device;
receiving, from a separate authentication device, identity information of the user of the remote controlled device and information of the remote controlled device via an authentication process, wherein the identity information establishes an identity of the user and the remote controlled device, and includes a unique code provided to the user by an authorizing agency of the remote controlled device as well as a registration number for the remote controlled device;
authenticating the user prior to allowing full functionality of the remote controlled device, including:
communicating with a database that includes records of authorized users for the remote controlled device,
comparing the identity information of the user with the records of the database, and
verifying the identity of the user, based on the comparing;
sending an indication of the identity of the user to the remote controlled device;
providing full functionality of the remote controlled device to the user during a second period of time in response to the authenticating;
maintaining a wireless link to the separate authentication device during operation of the remote controlled device;
detecting a disruption in the wireless link for greater than a predetermined amount of time during the operation of the remote controlled device; and
restricting the functionality of the remote controlled device, in response to detecting the disruption, including terminating a provision of operation commands to the remote controlled device.

9. The method as recited in claim 8, wherein the identity information further comprises:
a fingerprint of the user;
a voice sample of the user;
an optical scan of an eye of the user;
facial recognition of the user; and
a secure link with an electronic device of the user.

10. The method as recited in claim 8, further comprising, in response to determining during the authenticating that the user is verified as a trainee for the remote controlled device, enabling a trainer/trainee setting that allows a trainer to provide control of the remote controlled device to the trainee without functionality of the remote controlled device being limited.

11. The method as recited in claim 8, further comprising, during operation of the remote controlled device:
periodically reading a fingerprint of the user to ensure that the user is still controlling the remote controlled device,
requesting a spoken password from the user, and
performing a re-authentication of the user, based on the spoken password.

12. The method as recited in claim 8, wherein the indication of the identity of the user includes:
a name of the user,
a physical address of the user, an internet protocol (IP) address of a remote controller and the authentication device,
a media access control (MAC) address of the remote controller and the authentication device,
an image depicting at least a face of the user,
a registration code unique to the user, and
the unique code provided to the user by the authorizing agency of the remote controlled device.

13. The method as recited in claim 8, further comprising restricting the full functionality of the remote controlled device to the user to a predetermined level of functionality, based on a class of the user.

14. The method as recited in claim 8, further comprising:
in response to determining during the authenticating that the user is verified as a trainee for the remote controlled device, enabling a trainer/trainee setting that allows a trainer to provide control of the remote controlled device to the trainee without functionality of the remote controlled device being limited; and
during operation of the remote controlled device:
periodically reading a fingerprint of the user to ensure that the user is still controlling the remote controlled device,
requesting a spoken password from the user, and
performing a re-authentication of the user, based on the spoken password;
wherein the identity information further comprises:
a fingerprint of the user,
a voice sample of the user,
an optical scan of an eye of the user,
facial recognition of the user, and
a secure link with an electronic device of the user;
wherein the indication of the identity of the user includes:
a name of the user,
a physical address of the user,
an internet protocol (IP) address of a remote controller and the authentication device,
a media access control (MAC) address of the remote controller and the authentication device,
an image depicting at least a face of the user,
a registration code unique to the user, and
the unique code provided to the user by the authorizing agency of the remote controlled device.

15. A computer program product, the computer program product comprising a computer readable storage medium having program instructions embodied therewith, wherein the computer readable storage medium is not a transitory signal per se, the embodied program instructions being executable by a processing circuit to cause the processing circuit to:
limit, by the processing circuit, functionality of a remote controlled device during a first period of time where a user of the remote controlled device is not authenticated, including:
setting a rotations per minute (RPM) limiter on one or more propellers of the remote controlled device,
disabling one or more cameras of the remote controlled device, and
disabling audio recording and transmission of the remote controlled device;
receive, by the processing circuit, from a separate authentication device, identity information of the user of the remote controlled device and information of the remote controlled device via an authentication process, wherein the identity information establishes an identity of the user and the remote controlled device, and includes a unique code provided to the user by an authorizing agency of the remote controlled device as well as a registration number for the remote controlled device;
authenticate, by the processing circuit, the user prior to allowing full functionality of the remote controlled device, including:
communicating with a database that includes records of authorized users for the remote controlled device,
comparing the identity information of the user with the records of the database, and
verifying the identity of the user, based on the comparing;
send, by the processing circuit, an indication of the identity of the user to the remote controlled device;
provide, by the processing circuit, full functionality of the remote controlled device to the user during a second period of time in response to the authenticating;
maintain, by the processing circuit, a wireless link to the separate authentication device during operation of the remote controlled device;
detect, by the processing circuit, a disruption in the wireless link for greater than a predetermined amount of time during the operation of the remote controlled device; and
restrict, by the processing circuit, the functionality of the remote controlled device, in response to detecting the disruption, including terminating a provision of operation commands to the remote controlled device.

16. The computer program product as recited in claim 15, wherein the identity information further comprises:
a fingerprint of the user;
a voice sample of the user;
an optical scan of an eye of the user;
facial recognition of the user; and
a secure link with an electronic device of the user.

17. The computer program product as recited in claim 15, wherein the program instructions are further executable by the processing circuit to cause the processing circuit to, in response to determining during the authenticating that the user is verified as a trainee for the remote controlled device, enable, by the processing circuit, a trainer/trainee setting that allows a trainer to provide control of the remote controlled device to the trainee without functionality of the remote controlled device being limited.

18. The computer program product as recited in claim 15, wherein the program instructions are further executable by the processing circuit to cause the processing circuit to, during operation of the remote controlled device:
periodically read, by the processing circuit, a fingerprint of the user to ensure that the user is still controlling the remote controlled device,
request, by the processing circuit, a spoken password from the user, and
perform, by the processing circuit, a re-authentication of the user, based on the spoken password.

19. The computer program product as recited in claim 15, wherein the indication of the identity of the user includes:
a name of the user,
a physical address of the user,
an internet protocol (IP) address of a remote controller and the authentication device,
a media access control (MAC) address of the remote controller and the authentication device,
an image depicting at least a face of the user,
a registration code unique to the user, and
the unique code provided to the user by the authorizing agency of the remote controlled device.

* * * * *